L. SMITH.
EXPOSURE TABLE.
APPLICATION FILED JAN. 24, 1920.

1,348,382.

Patented Aug. 3, 1920.

Inventor
Louis Smith

By Herbert E. Smith
Attorney

UNITED STATES PATENT OFFICE.

LOUIS SMITH, OF HILLYARD, WASHINGTON.

EXPOSURE-TABLE.

1,348,382. Specification of Letters Patent. Patented Aug. 3, 1920.

Application filed January 24, 1920. Serial No. 353,769.

*To all whom it may concern:*

Be it known that I, LOUIS SMITH, a citizen of the Dominion of Canada, subject of the King of Great Britain, residing at Hillyard, in the county of Spokane and State of Washington, have invented certain new and useful Improvements in Exposure-Tables, of which the following is a specification.

My present invention relates to improvements in camera exposure tables designed especially for use in connection with cameras, as an attached part thereof, by means of which the operator of the camera may keep a concise and convenient tabulation of the exposures made and subjects of the pictures, in chronological order, together with data concerning sea levels, altitude, weather conditions, &c., especially useful for amateur photographers and of value and information for professional users of the camera.

The primary object of the invention is the provision of a device forming part of the camera, for inclosing and retaining the necessary data on tabulated cards that are readily accessible for checking, and may also with facility and despatch be removed or replaced when required.

With this end in view the invention consists in the combination with the data cards of a specially constructed frame and case forming part of the camera body for holding the cards and providing ready access thereto, as will be hereinafter more fully pointed out and claimed.

In the accompanying drawings I have illustrated one complete example of the physical embodiment of my invention constructed and arranged according to the best mode I have so far devised for the practical application of the principles of my invention.

In order that the utility of the invention may be readily understood I have illustrated a camera C of usual or standard type to which the device of the invention is attached and of which it forms an attached part, being secured at the outer side of the body of the camera in convenient position for access and use.

Figure 1:
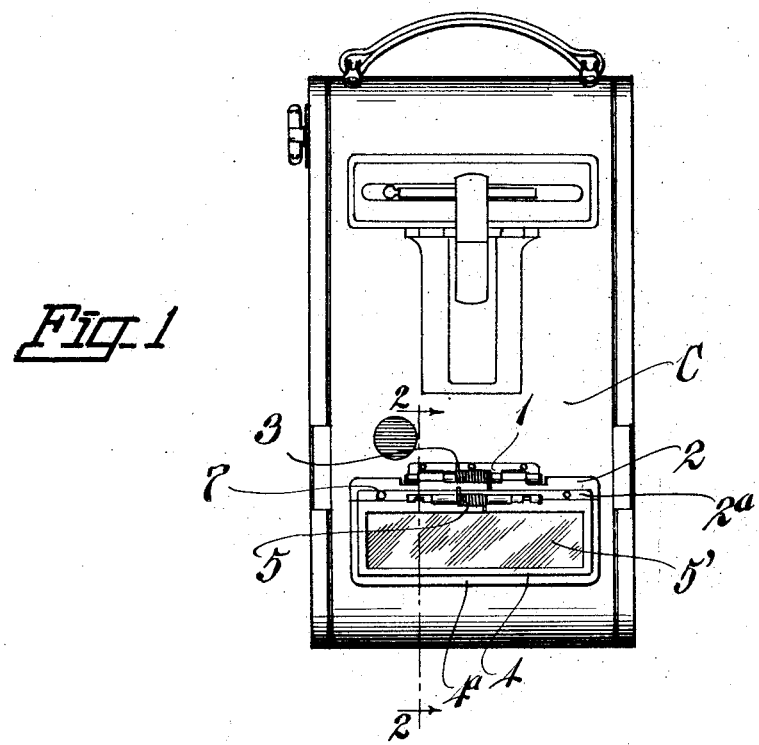
Figure 1 is a view in elevation of a well known type of camera having embodied thereon the device of my invention, showing the general relation of parts.
Figure 2:
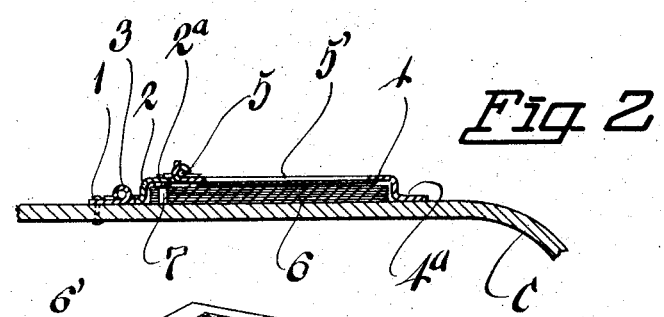
Fig. 2 is an enlarged sectional view on line 2—2 of Fig. 1 showing a portion of the body of the camera and the device of the invention in transverse section.
Figure 3:
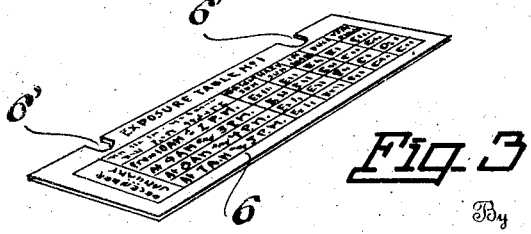
Fig. 3 is a perspective view of one of the data sheets or cards separated from the device.

In the equipment of the camera with the invention I utilize a metallic base plate 1 rigidly and securely fastened to the camera, transversely thereof as shown in Fig. 1 and to this plate a hinged frame plate 2 is connected by the spring hinge joint 3, the plate 2 being offset and formed with a spaced flange $2^a$ separated from the camera as shown in Fig. 2.

A second hinged member or frame 4 is provided with a spring hinge 5 connecting it with the offset $2^a$ of the plate 2 and flush with the surface of the offset plate or flange $2^a$, and this frame plate is fashioned with a flat flange $4^a$ extending around the three edges, or two ends and one side of the hinged frame element as shown in Figs. 1 and 2.

Thus the base plate fixed to the camera, the hinged plate 2 and the hinged frame 4 form a doubly hinged or jointed rectangular inclosing casing with a spring hinge 5 between the frame 4 and the hinged plate 2, and the frame is provided with a window or transparent sheet 5' of suitable material to render visible the data sheets 6 that are retained in the casing beneath the transparent plate 5'.

A suitable number of data sheets or cards 6 are used and each is provided with a pair of spaced notches 6' along one edge, and the alined, loose leaves or sheets are adapted to coincide with and engage by their notches the pins 7 that extend inwardly from the inner face of the hinged plate $2^a$.

The several parts of the casing are fashioned of sheet metal, preferably of an ornamental character, and the data cards may be of paper, celluloid or thin metal as desired, and are retained in the casing by the engagement of the notches with the pins or posts, and by the spring pressed plate $2^a$. The hinged cover or frame 4 with its window 5' is held closely against the camera body by its spring and the spring operated hinged plate 2 is also held in normal position by its spring 3; thus all parts of the device are closely and compactly held in position by means of the spring hinges and the data sheets or cards are inclosed within the casing.

The data cards are arranged chronologically, somewhat in the order of a calendar, and bear yearly and monthly designations, and the data or tabulations on each card are prepared with accordance to the conditions on the monthly cards. As for instance, the cards bear tables or tabulations regarding sea level conditions, altitudes, fogs, dark weather, and information concerning these conditions as to the time for exposure. A wide range of information and data as to exposure and light conditions may be carried on the cards to guide the photographer in his work.

The spring pressed frame may with facility be opened to give access to the cards or data sheets 6, and the card corresponding to the month of use, as indicated at the left end of the card, may be selected for reference, and after the required information has been secured and made use of, the card may be replaced in the series or pack, in its proper place, and the whole inclosed under the frame which is then returned to place for the protection of the data sheets or cards.

What I claim is—

1. The combination with the camera and a fixed base plate, of a parallel offset frame plate hinged to the base plate and a cover frame hinged with a spring joint to the frame plate forming a casing, data cards in the casing, and means therein for holding said cards.

2. The combination with the camera back and a fixed base plate, of a hinged frame plate having an offset and base flange, an open frame hinged to said frame plate and forming therewith an inclosing casing having a window, notched data cards in said casing and retaining pins on said frame plate co-acting with said notched cards to retain them in position.

3. The combination with a camera back and a fixed plate thereon, of a movable frame plate and a hinge joint connecting said fixed plate and movable plate, said movable plate having an offset portion and retaining means thereon for co-action with data cards, an open casing to inclose said cards and a flat flange on three sides of said casing to engage against the camera, and a spring hinge joint between the open casing and the offset portion of the frame plate, for holding said casing over the cards.

In testimony whereof I affix my signature.

LOUIS SMITH.